United States Patent
Fernandez et al.

(10) Patent No.: US 8,309,892 B2
(45) Date of Patent: *Nov. 13, 2012

(54) CONTROL SYSTEM FOR OPERATING AUTOMOTIVE VEHICLE COMPONENTS

(75) Inventors: Lucas Fernandez, Toronto (CA); Konstantin Majarov, Windsor (CA)

(73) Assignee: W.E.T. Automotive System, Ltd, Windsor, Ontario ( * ) Notice: Subject to any disclaimer, the term of this patent is extended or adjusted under 35 U.S.C. 154(b) by 28 days.

This patent is subject to a terminal disclaimer.

(21) Appl. No.: 12/861,303

(22) Filed: Aug. 23, 2010

(65) Prior Publication Data
US 2010/0314382 A1   Dec. 16, 2010

Related U.S. Application Data

(63) Continuation of application No. 11/842,425, filed on Aug. 21, 2007, now Pat. No. 7,781,704, which is a continuation of application No. 10/946,218, filed on Sep. 21, 2004, now Pat. No. 7,274,007.

(60) Provisional application No. 60/505,983, filed on Sep. 25, 2003.

(51) Int. Cl.
*B23K 10/00* (2006.01)

(52) U.S. Cl. .. 219/497; 219/121.5; 219/75; 219/121.52; 219/121.48

(58) Field of Classification Search ........... 219/202.203, 219/205, 206, 481, 492, 505, 494, 507
See application file for complete search history.

(56) References Cited

U.S. PATENT DOCUMENTS

| | | |
|---|---|---|
| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |

(Continued)

FOREIGN PATENT DOCUMENTS
CA   1266925   7/1960

(Continued)

OTHER PUBLICATIONS

Automotive Heated Seats—Heated Steering Wheels; IGB Automotive Ltd., 3090 Marentette Ave., Windsor, ON N8X 4G2, published prior to Jan. 10, 2003.

(Continued)

*Primary Examiner* — Mark Paschall
(74) *Attorney, Agent, or Firm* — Dobrusin & Thennisch PC

(57) ABSTRACT

There is disclosed a control system for operating automotive vehicle components. The control system typically includes at least a control module programmed with instructions for controlling a heater, a ventilator or both.

20 Claims, 3 Drawing Sheets

U.S. PATENT DOCUMENTS

| | | | |
|---|---|---|---|
| 2,749,906 A | 6/1956 | O'Connor | |
| 2,758,532 A | 8/1956 | Awe | |
| 2,782,834 A | 2/1957 | Vigo | |
| 2,791,956 A | 5/1957 | Guest | |
| 2,826,135 A | 3/1958 | Benzick | |
| 2,912,832 A | 11/1959 | Clark | |
| 2,931,286 A | 4/1960 | Fry, Sr. et al. | |
| 2,976,700 A | 3/1961 | Jackson | |
| 2,978,972 A | 4/1961 | Hake | |
| 2,992,604 A | 7/1961 | Trotman et al. | |
| 2,992,605 A | 7/1961 | Trotman et al. | |
| 3,030,145 A | 4/1962 | Kottemann | |
| 3,101,037 A | 8/1963 | Taylor | |
| 3,101,660 A | 8/1963 | Taylor | |
| 3,127,931 A | 4/1964 | Johnson | |
| 3,131,967 A | 5/1964 | Spaulding | |
| 3,136,577 A | 6/1964 | Richard | |
| 3,137,523 A | 6/1964 | Karner | |
| 3,162,489 A | 12/1964 | Trotman | |
| 3,209,380 A | 10/1965 | Watsky | |
| 3,486,177 A | 12/1969 | Marshack | |
| 3,529,310 A | 9/1970 | Olmo | |
| 3,550,523 A | 12/1970 | Segal | |
| 3,552,133 A | 1/1971 | Lukomsky | |
| 3,628,829 A | 12/1971 | Hellig | |
| 3,638,255 A | 2/1972 | Sterrett | |
| 3,653,589 A | 4/1972 | McGrath | |
| 3,653,590 A | 4/1972 | Elsea | |
| 3,681,797 A | 8/1972 | Messner | |
| 3,684,170 A | 8/1972 | Roof | |
| 3,732,944 A | 5/1973 | Kendall | |
| 3,736,022 A | 5/1973 | Radke | |
| 3,738,702 A | 6/1973 | Jacobs | |
| 3,757,366 A | 9/1973 | Sacher | |
| 3,770,318 A | 11/1973 | Fenton | |
| 3,778,851 A | 12/1973 | Howorth | |
| 3,948,246 A | 4/1976 | Jenkins | |
| 4,002,108 A | 1/1977 | Drori | |
| 4,043,544 A | 8/1977 | Ismer | |
| 4,044,221 A | 8/1977 | Kuhn | |
| 4,060,276 A | 11/1977 | Lindsay | |
| 4,065,936 A | 1/1978 | Fenton et al. | |
| 4,072,344 A | 2/1978 | Li | |
| 4,141,585 A | 2/1979 | Blackman | |
| 4,175,297 A | 11/1979 | Robbins et al. | |
| 4,245,149 A | 1/1981 | Fairlie | |
| 4,259,896 A | 4/1981 | Hayashi et al. | |
| 4,268,272 A | 5/1981 | Taura | |
| 4,335,725 A | 6/1982 | Geldmacher | |
| 4,379,352 A | 4/1983 | Hauslein et al. | |
| 4,391,009 A | 7/1983 | Schild et al. | |
| 4,411,385 A | 10/1983 | Lamkewitz | |
| 4,413,857 A | 11/1983 | Hayashi | |
| 4,509,792 A | 4/1985 | Wang | |
| 4,563,387 A | 1/1986 | Takagi et al. | |
| 4,572,430 A | 2/1986 | Takagi et al. | |
| 4,589,656 A | 5/1986 | Baldwin | |
| 4,665,707 A | 5/1987 | Hamilton | |
| 4,671,567 A | 6/1987 | Frobose | |
| 4,685,727 A | 8/1987 | Cremer et al. | |
| 4,712,832 A | 12/1987 | Antolini et al. | |
| 4,729,598 A | 3/1988 | Hess | |
| 4,777,802 A | 10/1988 | Feher | |
| 4,847,933 A | 7/1989 | Bedford | |
| 4,848,444 A | 7/1989 | Heinle et al. | |
| 4,853,992 A | 8/1989 | Yu | |
| 4,866,800 A | 9/1989 | Bedford | |
| 4,905,475 A | 3/1990 | Tuomi | |
| 4,923,248 A | 5/1990 | Feher | |
| 4,926,025 A | 5/1990 | Wilhelm | |
| 4,946,220 A | 8/1990 | Wyon et al. | |
| 4,964,674 A | 10/1990 | Altmann et al. | |
| 4,981,324 A | 1/1991 | Law | |
| 4,997,230 A | 3/1991 | Spitalnick | |
| 5,002,336 A | 3/1991 | Feher | |
| 5,004,294 A | 4/1991 | Lin | |
| 5,016,302 A | 5/1991 | Yu | |
| 5,076,643 A | 12/1991 | Colasanti et al. | |
| 5,102,189 A | 4/1992 | Saito et al. | |
| 5,106,161 A | 4/1992 | Meiller | |
| 5,117,638 A | 6/1992 | Feher | |
| 5,138,851 A | 8/1992 | Mardikian | |
| 5,160,517 A | 11/1992 | Hicks et al. | |
| 5,211,697 A | 5/1993 | Kienlein et al. | |
| 5,225,663 A | 7/1993 | Matsumura et al. | |
| 5,226,188 A | 7/1993 | Liou | |
| 5,285,963 A | 2/1994 | Wakefield et al. | |
| 5,292,577 A | 3/1994 | Van Kerrebrouck et al. | |
| 5,335,381 A | 8/1994 | Chang | |
| 5,354,117 A | 10/1994 | Danielson et al. | |
| 5,356,205 A | 10/1994 | Calvert et al. | |
| 5,370,439 A | 12/1994 | Lowe et al. | |
| 5,372,402 A | 12/1994 | Kuo | |
| 5,382,075 A | 1/1995 | Shih | |
| 5,385,382 A | 1/1995 | Single, II et al. | |
| 5,403,065 A | 4/1995 | Callerio | |
| 5,408,711 A | 4/1995 | McClelland | |
| 5,411,318 A | 5/1995 | Law | |
| 5,416,935 A | 5/1995 | Nieh | |
| 5,450,894 A | 9/1995 | Inoue et al. | |
| 5,516,189 A | 5/1996 | Ligeras | |
| 5,524,439 A | 6/1996 | Gallup et al. | |
| 5,561,875 A | 10/1996 | Graebe | |
| 5,590,428 A | 1/1997 | Roter | |
| 5,597,200 A | 1/1997 | Gregory et al. | |
| 5,613,729 A | 3/1997 | Summer, Jr. | |
| 5,613,730 A | 3/1997 | Buie et al. | |
| 5,626,021 A | 5/1997 | Karunasiri et al. | |
| 5,626,386 A | 5/1997 | Lush | |
| 5,626,387 A | 5/1997 | Yeh | |
| 5,639,145 A | 6/1997 | Alderman | |
| 5,645,314 A | 7/1997 | Liou | |
| 5,692,952 A | 12/1997 | Chih-Hung | |
| 5,701,621 A | 12/1997 | Landi et al. | |
| 5,715,695 A | 2/1998 | Lord | |
| 5,787,534 A | 8/1998 | Hargest et al. | |
| 5,833,309 A | 11/1998 | Schmitz | |
| 5,833,321 A | 11/1998 | Kim et al. | |
| 5,870,282 A | 2/1999 | Andre et al. | |
| 5,878,809 A | 3/1999 | Heinle | |
| 5,887,304 A | 3/1999 | Von der Heyde | |
| 5,897,162 A | 4/1999 | Humes et al. | |
| 5,902,014 A | 5/1999 | Dinkel et al. | |
| 5,918,930 A | 7/1999 | Kawai et al. | |
| 5,921,100 A | 7/1999 | Yoshinori et al. | |
| 5,921,314 A | 7/1999 | Schuller et al. | |
| 5,921,858 A | 7/1999 | Kawai et al. | |
| 5,924,766 A | 7/1999 | Esaki et al. | |
| 5,924,767 A | 7/1999 | Pietryga | |
| 5,927,817 A | 7/1999 | Ekman et al. | |
| 5,934,748 A | 8/1999 | Faust et al. | |
| 5,948,297 A | 9/1999 | Haubner et al. | |
| 6,003,950 A | 12/1999 | Larsson | |
| 6,019,420 A | 2/2000 | Faust et al. | |
| 6,048,024 A | 4/2000 | Wallman | |
| 6,049,927 A | 4/2000 | Thomas et al. | |
| 6,059,018 A | 5/2000 | Yoshinori et al. | |
| 6,059,362 A | 5/2000 | Lin | |
| 6,062,641 A | 5/2000 | Suzuki et al. | |
| 6,064,037 A | 5/2000 | Weiss et al. | |
| 6,068,332 A | 5/2000 | Faust et al. | |
| 6,070,115 A | 5/2000 | Oestreicher et al. | |
| 6,079,485 A | 6/2000 | Esaki et al. | |
| 6,085,369 A | 7/2000 | Feher | |
| 6,105,667 A | 8/2000 | Yoshinori et al. | |
| 6,109,688 A | 8/2000 | Wurz et al. | |
| 6,118,099 A | 9/2000 | Lake et al. | |
| 6,119,463 A | 9/2000 | Bell | |
| 6,124,577 A | 9/2000 | Fristedt | |
| 6,145,925 A | 11/2000 | Eksin et al. | |
| 6,147,332 A | 11/2000 | Holmberg et al. | |
| 6,164,719 A | 12/2000 | Rauh | |
| 6,179,706 B1 | 1/2001 | Yoshinori et al. | |
| 6,186,592 B1 | 2/2001 | Orizaris et al. | |
| 6,189,520 B1 | 2/2001 | Cook et al. | |
| 6,189,966 B1 | 2/2001 | Faust et al. | |
| 6,196,627 B1 | 3/2001 | Faust et al. | |

| | | |
|---|---|---|
| 6,222,164 B1 | 4/2001 | Stoddard et al. |
| 6,223,539 B1 | 5/2001 | Bell |
| 6,224,150 B1 | 5/2001 | Eksin et al. |
| 6,237,675 B1 | 5/2001 | Oehring et al. |
| 6,252,208 B1 | 6/2001 | Topp |
| 6,254,179 B1 | 7/2001 | Kortume et al. |
| 6,263,530 B1 | 7/2001 | Feher |
| 6,273,810 B1 | 8/2001 | Rhodes et al. |
| 6,277,023 B1 | 8/2001 | Schwartz |
| 6,278,090 B1 | 8/2001 | Fristedt et al. |
| 6,291,803 B1 | 9/2001 | Fourrey |
| 6,300,150 B1 | 10/2001 | Venkatasubramanian |
| 6,321,996 B1 | 11/2001 | Odebrecht et al. |
| 6,415,501 B1 | 7/2002 | Schlesselman |
| 6,425,637 B1 | 7/2002 | Peterson |
| 6,434,328 B2 | 8/2002 | Rutherford |
| 6,445,988 B1 | 9/2002 | Breed et al. |
| 6,454,178 B1 | 9/2002 | Fusco et al. |
| 6,478,369 B1 | 11/2002 | Aoki et al. |
| 6,480,103 B1 | 11/2002 | McCarthy et al. |
| 6,481,801 B1 | 11/2002 | Schmale |
| 6,483,087 B2 | 11/2002 | Gardner et al. |
| 6,491,578 B2 | 12/2002 | Yoshinori et al. |
| 6,497,275 B1 | 12/2002 | Elliot |
| 6,501,055 B2 | 12/2002 | Rock et al. |
| 6,505,886 B2 | 1/2003 | Gielda et al. |
| 6,511,125 B1 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson et al. |
| 6,590,354 B2 | 7/2003 | Hein |
| 6,592,181 B2 | 7/2003 | Stiller et al. |
| 6,598,405 B2 | 7/2003 | Bell |
| 6,604,785 B2 | 8/2003 | Bargheer et al. |
| 6,606,866 B2 | 8/2003 | Bell |
| 6,619,736 B2 | 9/2003 | Stowe et al. |
| 6,625,990 B2 | 9/2003 | Bell |
| 6,626,386 B1 | 9/2003 | Stiner et al. |
| 6,626,455 B2 | 9/2003 | Webber et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,664,518 B2 | 12/2003 | Fristedt |
| 6,682,140 B2 | 1/2004 | Minuth et al. |
| 6,685,553 B2 | 2/2004 | Aoki |
| 6,686,561 B2 | 2/2004 | Horey et al. |
| 6,719,624 B2 | 4/2004 | Hayashi et al. |
| 6,722,148 B2 | 4/2004 | Aoki et al. |
| 6,727,467 B1 | 4/2004 | Hadzizukic et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |
| 6,828,528 B2 | 12/2004 | Stöwe et al. |
| 6,844,524 B2 | 1/2005 | Downey et al. |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,893,086 B2 | 5/2005 | Bajic et al. |
| 6,903,312 B2 | 6/2005 | Miura et al. |
| 6,929,322 B2 | 8/2005 | Aoki et al. |
| 6,957,545 B2 | 10/2005 | Aoki |
| 6,976,734 B2 | 12/2005 | Stoewe |
| 7,052,091 B2 | 5/2006 | Bajic et al. |
| 7,083,227 B2 | 8/2006 | Brennan et al. |
| 7,131,689 B2 | 11/2006 | Brennan et al. |
| 7,274,007 B2 | 9/2007 | Fernandez et al. |
| 7,306,283 B2 | 12/2007 | Howick |
| 7,338,117 B2 | 3/2008 | Ibqal et al. |
| 7,356,912 B2 | 4/2008 | Ibqal et al. |
| 7,370,911 B2 | 5/2008 | Bajic et al. |
| 2001/0013512 A1 | 8/2001 | Eisenhardt et al. |
| 2001/0035669 A1 | 11/2001 | Andersson et al. |
| 2002/0003363 A1 | 1/2002 | Buss et al. |
| 2002/0017102 A1 | 2/2002 | Bell |
| 2002/0065726 A1 | 5/2002 | Bhyravabhotla |
| 2002/0067058 A1 | 6/2002 | Pfahler |
| 2002/0092308 A1 | 7/2002 | Bell |
| 2002/0096915 A1 | 7/2002 | Haupt et al. |
| 2002/0096931 A1 | 7/2002 | White et al. |
| 2002/0105213 A1 | 8/2002 | Rauh et al. |
| 2002/0108381 A1 | 8/2002 | Bell |
| 2002/0139123 A1 | 10/2002 | Bell |
| 2002/0140258 A1 | 10/2002 | Ekern et al. |
| 2002/0148234 A1 | 10/2002 | Bell |
| 2002/0148235 A1 | 10/2002 | Bell |
| 2002/0148236 A1 | 10/2002 | Bell |
| 2002/0148345 A1 | 10/2002 | Hagiwari |
| 2002/0150478 A1 | 10/2002 | Aoki |
| 2003/0005706 A1 | 1/2003 | Bell |
| 2003/0024924 A1 | 2/2003 | Fristedt |
| 2003/0029173 A1 | 2/2003 | Bell et al. |
| 2003/0079770 A1 | 5/2003 | Bell |
| 2003/0084935 A1 | 5/2003 | Bell |
| 2003/0102699 A1 | 6/2003 | Aoki et al. |
| 2003/0141289 A1 | 7/2003 | Fisher |
| 2003/0150229 A1 | 8/2003 | Aoki et al. |
| 2004/0007567 A1 | 1/2004 | Downey et al. |
| 2004/0036326 A1 | 2/2004 | Bajic |
| 2004/0058181 A1 | 3/2004 | Garnault et al. |
| 2004/0104607 A1 | 6/2004 | Minegishi et al. |
| 2004/0118555 A1 | 6/2004 | Fristedt |
| 2004/0139758 A1 | 7/2004 | Kamiya et al. |
| 2004/0189061 A1 | 9/2004 | Hartwick et al. |
| 2004/0195870 A1 | 10/2004 | Bohlender et al. |
| 2004/0245811 A1 | 12/2004 | Bevan et al. |
| 2005/0093347 A1 | 5/2005 | Bajic et al. |
| 2005/0173950 A1 | 8/2005 | Bajic et al. |
| 2005/0200179 A1 | 9/2005 | Bevan et al. |
| 2005/0231652 A1 | 10/2005 | Liu et al. |
| 2005/0257541 A1 | 11/2005 | Kadle et al. |
| 2005/0264086 A1 | 12/2005 | Lofy et al. |
| 2006/0158011 A1 | 7/2006 | Marlovits et al. |

FOREIGN PATENT DOCUMENTS

| | | |
|---|---|---|
| CA | 2393970 | 6/2001 |
| DE | 3513909 | 10/1986 |
| DE | 37 05 756 | 10/1988 |
| DE | 41 12 631 | 4/1992 |
| DE | 4141224 A1 | 6/1993 |
| DE | 19503291 | 8/1996 |
| DE | 19654370 | 3/1998 |
| DE | 197 36 951 | 3/1999 |
| DE | 197 37 636 | 3/1999 |
| DE | 19805174 | 6/1999 |
| DE | 198 10 936 | 9/1999 |
| DE | 199 20 451 | 12/1999 |
| DE | 19844514 C1 | 1/2000 |
| DE | 199 54 97 | 1/2001 |
| DE | 100 01 314 | 7/2001 |
| DE | 100 24 880 | 9/2001 |
| DE | 10013492 | 9/2001 |
| DE | 10030708 | 1/2002 |
| DE | 10144839 | 3/2003 |
| DE | 10241571 | 3/2004 |
| DE | 10261902 | 8/2004 |
| DE | 10316732 | 10/2004 |
| DE | 10338525 | 3/2005 |
| DE | 10346064 | 4/2005 |
| EP | 0 128 534 | 12/1984 |
| EP | 0 280 213 | 8/1988 |
| EP | 0 517 615 | 12/1992 |
| EP | 411375 | 5/1994 |
| EP | 0809576 | 5/1999 |
| EP | 0 936 105 | 8/1999 |
| EP | 0 730 720 | 7/2000 |
| EP | 1088696 | 9/2000 |
| EP | 1050429 | 11/2000 |
| EP | 1123834 | 2/2001 |
| EP | 1266794 | 12/2002 |

| | | |
|---|---|---|
| EP | 1 075 984 | 5/2003 |
| EP | 1323573 | 7/2003 |
| EP | 1345104 A1 | 9/2003 |
| EP | 1349746 | 8/2005 |
| FR | 1266925 | 9/1960 |
| FR | 2599683 | 6/1986 |
| FR | 2630056 | 10/1989 |
| FR | 2694527 A1 | 2/1994 |
| FR | 2845318 | 4/2004 |
| JP | 1171509 | 7/1989 |
| JP | 5277020 | 10/1993 |
| JP | 8285423 | 11/1996 |
| JP | 10044756 | 2/1998 |
| JP | 2000125990 | 2/2000 |
| JP | 2001071800 | 3/2001 |
| JP | 2002125801 | 5/2002 |
| JP | 2002225539 | 8/2002 |
| JP | 2002234332 | 8/2002 |
| JP | 2003042594 | 2/2003 |
| JP | 2004224108 | 8/2004 |
| JP | 2004283403 | 10/2004 |
| SE | 202556 | 3/1966 |
| SE | 0102983 | 3/2003 |
| WO | 91/12150 | 8/1991 |
| WO | 94/09684 A1 | 5/1994 |
| WO | 96/05475 | 2/1996 |
| WO | 97/09908 | 3/1997 |
| WO | 99/00268 | 1/1999 |
| WO | 99/32309 A1 | 7/1999 |
| WO | 02/06914 A1 | 1/2002 |
| WO | 02/005341 | 7/2002 |
| WO | 03/015583 A2 | 2/2003 |
| WO | 03/051666 | 6/2003 |
| WO | 03/077710 | 9/2003 |
| WO | 03/101777 | 12/2003 |
| WO | 03/106215 | 12/2003 |
| WO | 2004/082989 | 3/2004 |
| WO | 2004/028857 | 4/2004 |
| WO | 2004/078517 | 9/2004 |
| WO | 2004/091966 | 10/2004 |
| WO | 2004/091967 | 10/2004 |
| WO | 2004/096601 | 11/2004 |
| WO | 2004/096602 | 11/2004 |
| WO | 2004/114513 | 12/2004 |
| WO | 2005/021320 | 3/2005 |
| WO | 2005/035305 | 4/2005 |
| WO | 2005/042299 | 5/2005 |
| WO | 2005/042301 | 5/2005 |
| WO | 2005/047056 | 5/2005 |
| WO | 2005/068253 | 7/2005 |
| WO | 2005/110806 | 11/2005 |

OTHER PUBLICATIONS

Automotive Heated Seats—Heated Steering Wheels, IGB Automotive Ltd., received by Assignee W.E.T. Automotive Systems, May 2003.

Automotive Seat Heating Systems, Bauerhin International, received by Assignee W.E.T. Automotive Systems, May 2002.

Excerpt from website http://www.icar.com/html_pages /about_icar/current_events_news/advantage/advantageI-Car Advantage Online.

Excerpt from website http://www.seatcomfort.com/ semashow1.htm, Specializing in Seat Ventilation and Heating Systems, Seat Comfort Systems Unveils 3 New Seat Heater Products.

Excerpt from website http://www.seatcomfort.com/ventilation.htm, Specializing in Seat Ventilation and Heating Systems, Ventilation.

GMT 830 Heating & Ventilation System, IGB Automotive Ltd., received by Assignee W.E.T. Automotive Systems, Jun. 2003.

International Search Report for Application Serial No. PCT/US03/19929, Oct. 10, 2003.

Komfortabel bei jeder Temperatur.

Seat Heating Systems, Kongsberg Automotive, believed to be from websitehttp://www.kongsberg-automotive.no/.

Copending U.S. Appl. No. 09/619,171, filed Jul. 19, 2000.

International Search Report, dated Feb. 2, 2005. PCT/EP04/010768.

CONTROL SYSTEM FOR OPERATING AUTOMOTIVE VEHICLE COMPONENTS

CLAIM OF BENEFIT OF FILING DATE

The present application is a continuation of and claims benefit to application Ser. No. 11/842,425 filed Aug. 21, 2007, which is a continuation of and claims benefit to application Ser. No. 10/946,218, filed on Sep. 21, 2004, now U.S. Pat. No. 7,274,007, issued Sep. 25, 2007 which is and claims benefit to a non-provisional of application Ser. No. 60/505,983 filed on Sep. 25, 2003, the contents of which are hereby incorporated by reference in their entirety.

FIELD OF THE INVENTION

The present invention relates generally to a control system for operating automotive vehicle components such as seat comfort components, instrument panel components or the like.

BACKGROUND OF THE INVENTION

For many years, the automotive industry has been designing control modules for operating automotive vehicle components. As examples, industry has designed control modules for operating automotive vehicle components such as seat comfort systems (e.g., heaters, ventilators, lumbar support systems, combinations thereof or the like), steering wheel heaters, ventilating and air conditioning systems (HVAC) systems, safety features or the like. In the interest of continuing such innovation, the present invention provides a control module, which may be suitable for various applications, but which has found particular utility in operating components of automotive vehicles.

SUMMARY OF THE INVENTION

A controller for controlling one or more components of an automotive vehicle is disclosed. The controller includes at least one control module in signaling communication with a energy source, a sensor, a power stage and a switch wherein the energy source provides power to a heater as dictated by the power stage. The sensor senses a temperature associated with the heater and the switch turns the heater on and off. The control module includes programming for comparing representative values originating from the sensor to a set of n set point values ($V_1 \ldots V_n$) wherein the representative values are representative of temperatures ($T_s$) sensed by the temperature sensor, the n set-point values are representative of n predetermined temperatures ($T_1 \ldots T_n$) and n is a whole number greater than 1. The module also includes programming for allowing n different amounts of energy ($E_1 \ldots E_n$) to be applied to the heater depending upon the representative values.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing a control system for operating components of an automotive vehicle. Generally, it is contemplated that the control system may be employed for operating most any components of the automotive vehicle. Moreover, it is contemplated that the control system may include a single control module, multiple control modules or a universal control module that integrates multiple control modules.

Preferably, the control system includes at least one control module useful for operating vehicle comfort systems including, but not limited to, seat and steering wheel heaters, seat ventilation systems, lumbar support systems, combinations thereof or the like. According to one aspect of the invention, a control module is provided for operating a heater of a steering handle (e.g., a steering wheel), a heater of a vehicle seat, a ventilation system of the vehicle seat or a combination thereof. An exemplary heater, ventilation system or combination thereof typically includes one or more conductors, one or more air movers (e.g., blowers) or a combination thereof in signaling communication with one or more control modules and one or more temperature sensors in signaling communication with the one or more control modules.

One example of a suitable handle or steering wheel heater is disclosed in U.S. Pat. No. 6,727,467, which is incorporated herein by reference for all purposes. One example of an integrated seat heater and seat ventilation system is disclosed in U.S. patent application Ser. No. 10/434,890, filed May 9, 2003, titled "Automotive Vehicle Seat Insert", which is hereby incorporated herein by reference for all purposes.

Figure 1:
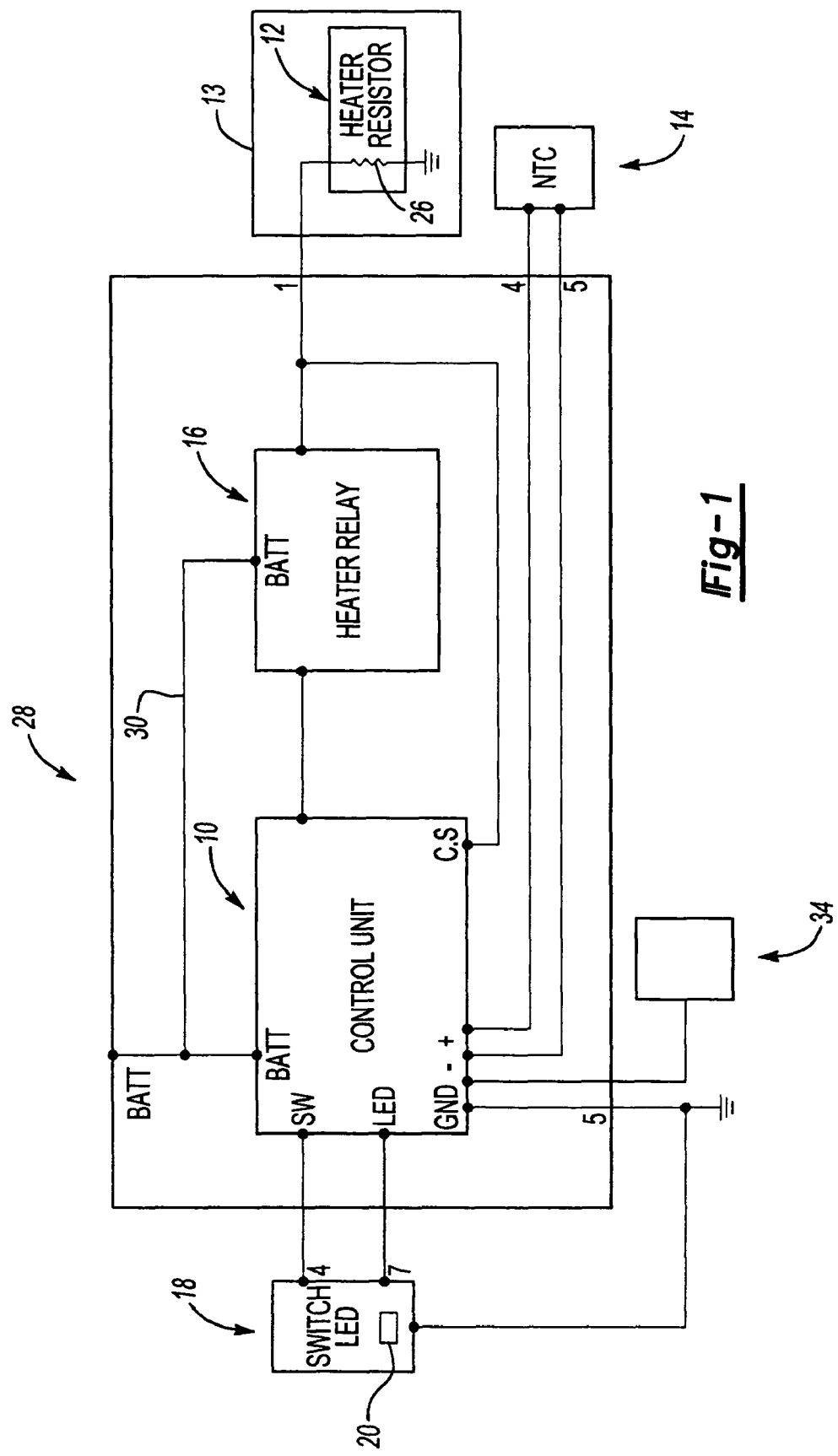
FIG. 1 is a schematic diagram of a heater system employing a control module according to an aspect of the present invention.
Figure 2:
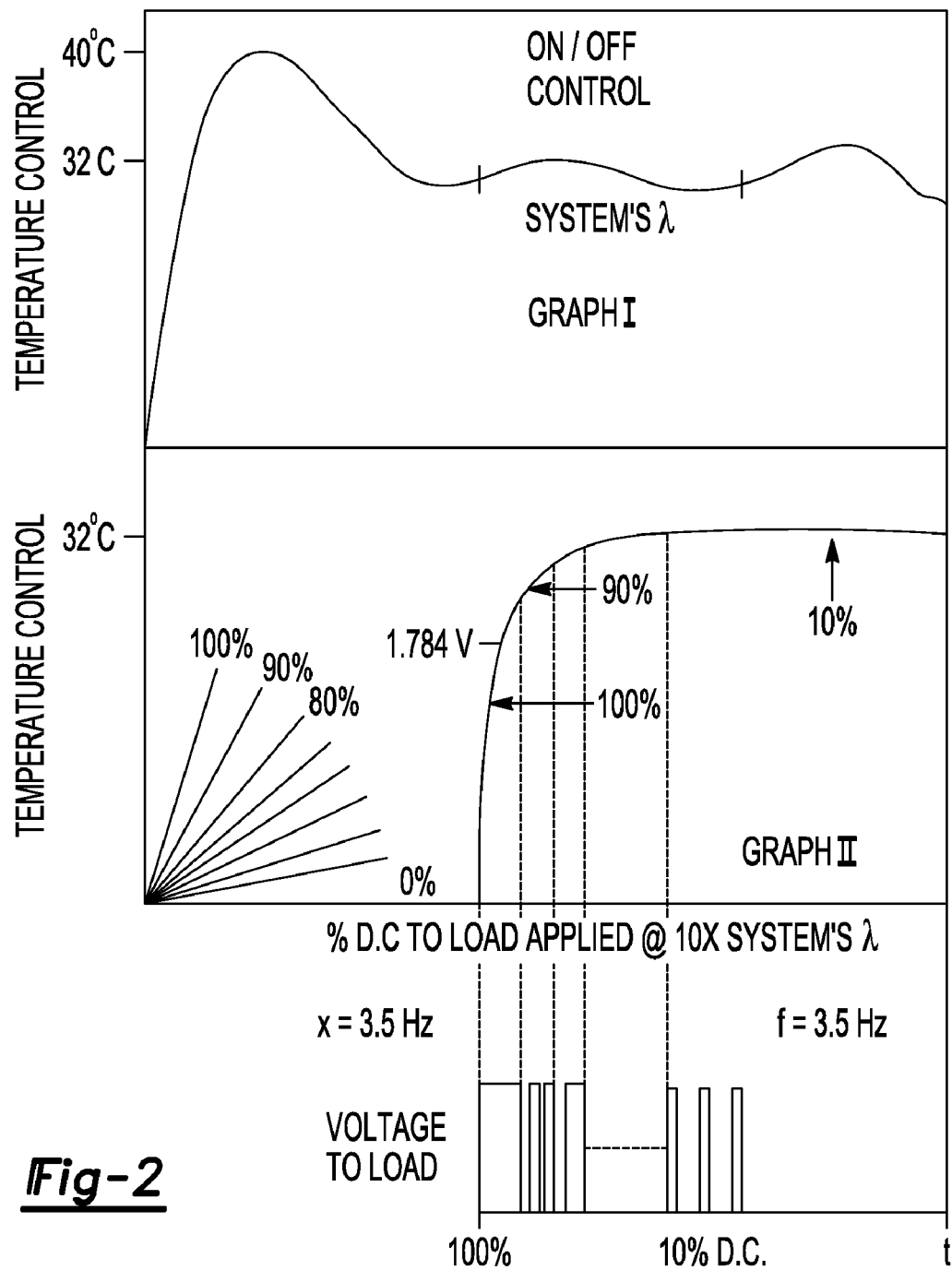
FIG. 2 illustrates graphs useful for understanding the operation of the heater system of FIG. 1.

Referring to FIG. 1, there is illustrated an exemplary control system in accordance with an aspect of the present invention. As can be seen, the system includes a control module 10 in signaling communication with one or more of a heater 12 (e.g., a steering wheel or seat heater), a temperature sensor 14, a power stage 16 and a switch 18, which preferably includes a light emitting diode (LED) 20, each of which is shown as blocks in the block diagram of FIG. 1. It should be understood that the circuits shown are exemplary and it is contemplated that other circuits may be employed within the scope of the present invention.

The heater 12 is preferably a resistive heater comprised of a plurality of conductors that act as one or more resistors 26, which may be configured in parallel, in series or otherwise. As shown, the heater 12 is in electrical communication with an energy source 28 (e.g., an automotive vehicle battery) via an electrical connection 30 (e.g., a wire or bus) and the power stage 16 is located along the electrical connection 30 for dictating amounts of energy provided by the energy source 28 delivers to the heater 12.

Typically, the heater 12 can be turned on by operating the switch 18 (e.g., a momentary switch) from an "off" configuration to an "on" configuration such that the switch 18 signals the control module 10 to allow the energy source 28 to deliver power (e.g., electrical energy) to the heater 12. In the embodiment shown, the control module 10 includes instructions for signaling the power stage 16 to allow an amount of energy (e.g., a percentage of a full voltage of the energy source 28) to be delivered to the heater 12.

In one embodiment, the control module 10 is programmed with instructions to apply an amount of energy to the heater 12 based upon a temperature sensed by the temperature sensor 14. Thus, in one embodiment, the control module 10 includes instructions for applying at least three different amounts (e.g., percentages such 0%, 20% or 100% of full energy) of energy to the heater if temperatures sensed are above or below at least three different predetermined temperatures.

In a preferred embodiment, a number (n) of predetermined temperatures ($T_1, T_2 \ldots T_n$) are selected wherein (n) is any whole number greater than two. $T_n$, is preferably the highest of the predetermined temperatures and is also preferably the desired temperature for the heater 12. Moreover, the temperature $T_{n-1}$ to $T_1$ preferably become progressively lower. Thus, for example, (n) could be equal to 7 and the following values may be chosen: $T_n$=30° C.; $T_{n-1}$=28° C.; $T_{n-2}$=26° C.; $T_{n-3}$=24° C.; $T_{1-4}$=22° C.; $T_{n-5}$=20° C.; $T_{n-6}$=18° C. Typically n is at least three, more typically at least five and even more typically at least seven.

In operation, the temperature sensor 14 senses a temperature associated with (i.e., a temperature at or adjacent) the heater 12. Thereafter, the temperature sensor 14 sends a signal to the control module 10 indicative or representative of the temperature sensed. For example, for a resistance based temperature sensor, a voltage is typically transmitted to the control module 10 wherein the voltage is representative of the temperature sensed. In such an embodiment, each predetermined temperature $T_1 \ldots T_n$ will respectively be associated with a predetermined voltage $V_1 \ldots V_n$ from the temperature sensor 14 and the predetermined voltages typically decline (e.g., by lowering DC voltage, decreasing duty cycle or the like) as the predetermined temperatures become higher. It should be understood that such temperature sensing is typically happening continuously or at intermittent time periods.

In the preferred embodiment, the control module 10 is programmed with instructions for commanding the power stage 16 to allow (n) different amounts of energy ($E_1 \ldots E_n$) to be delivered to the heater 12 depending upon the sensed temperature $T_s$ by the temperature sensor 14. In the embodiment, the different amounts of energy ($E_1 \ldots E_n$) are produced by differing the amount of time for which a single voltage is produced during a time period (e.g., a cycle) or by differing voltages provided to the heater during different time periods or may be otherwise provided as well. Preferably, the different amounts of energy ($E_1 \ldots E_n$) respectively inversely correspond to the predetermined temperatures ($T_1 \ldots T_n$) such that higher predetermined temperatures correspond to lower amounts of energy.

The control module 10 is also programmed with a set of instructions to compare a value representative of the sensed temperature $T_s$ with set-point values (e.g., the voltages $V_1 \ldots V_n$) that are representative of the predetermined temperatures ($T_1 \ldots T_n$) to determine the highest temperature of the predetermined temperatures ($T_1 \ldots T_n$) that $T_s$ is equal to or below. In turn, the control module 10 commands the power stage 16 to allow one of the different amounts of energy ($E_1 \ldots E_n$) corresponding to the highest temperature of the predetermined temperatures ($T_1 \ldots T_n$) that $T_s$ is equal to or below. Moreover, if the sensed temperature $T_s$ is equal to or above $T_n$ (i.e., the highest predetermined temperature) then $E_n$ (i.e., the lowest or zero amount of energy) is applied to the heater 12.

Accordingly, the table below provides an example of predetermined amounts of energy produced for voltages that are provided by a temperature sensor based upon sensed temperatures:

| Predetermined Temperatures (° C.) | Corresponding Resistances (Ohms) | Corresponding Voltages (Volts) | Predetermined amounts of Energy (% of duty cycle) |
|---|---|---|---|
| 25 | R ≦ 6610 | V ≦ 1.529 | 0 |
| 23 | 6610 ≦ R ≦ 6733 | 1.529 ≦ V ≦ 1.549 | 10 |
| 21 | 6733 ≦ R ≦ 6857 | 1.549 ≦ V ≦ 1.569 | 20 |
| 19 | 6857 ≦ R ≦ 6983 | 1.569 ≦ V ≦ 1.588 | 30 |
| 17 | 6983 ≦ R ≦ 7110 | 1.588 ≦ V ≦ 1.608 | 40 |
| 15 | 7110 ≦ R ≦ 7238 | 1.608 ≦ V ≦ 1.627 | 50 |
| 13 | 7238 ≦ R ≦ 7368 | 1.627 ≦ V ≦ 1.647 | 60 |
| 11 | 7368 ≦ R ≦ 7633 | 1.647 ≦ V ≦ 1.686 | 70 |
| 9 | 7633 ≦ R ≦ 7904 | 1.686 ≦ V ≦ 1.725 | 80 |
| 7 | 7904 ≦ R ≦ 8182 | 1.725 ≦ V ≦ 1.765 | 90 |
| 5 | 8182 ≦ R | 1.765 ≦ V | 100 |

Thus, instructions for the controller based upon the above table may be a set of conditions as follows:

```
If V ≦ 1.529 then E = 0%
If 1.549 ≦ V ≦ 1.529 then E = 10%
If 1.569 ≦ V ≦ 1.549 then E = 20%
If 1.588 ≦ V ≦ 1.569 then E = 30%
If 1.608 ≦ V ≦ 1.588 then E = 40%
If 1.627 ≦ V ≦ 1.608 then E = 50%
If 1.647 ≦ V ≦ 1.627 then E = 60%
If 1.686 ≦ V ≦ 1.647 then E = 70%
If 1.725 ≦ V ≦ 1.686 then E = 80%
If 1.765 ≦ V ≦ 1.725 then E = 90%
If 1.784 ≦ V ≦ 1.765 then E = 100%
```

It should be recognized that these instructions may be programmed into the control module in a variety of ways and that various different instructions may provide the various energy outputs for the various temperature ranges.

Figure 3:
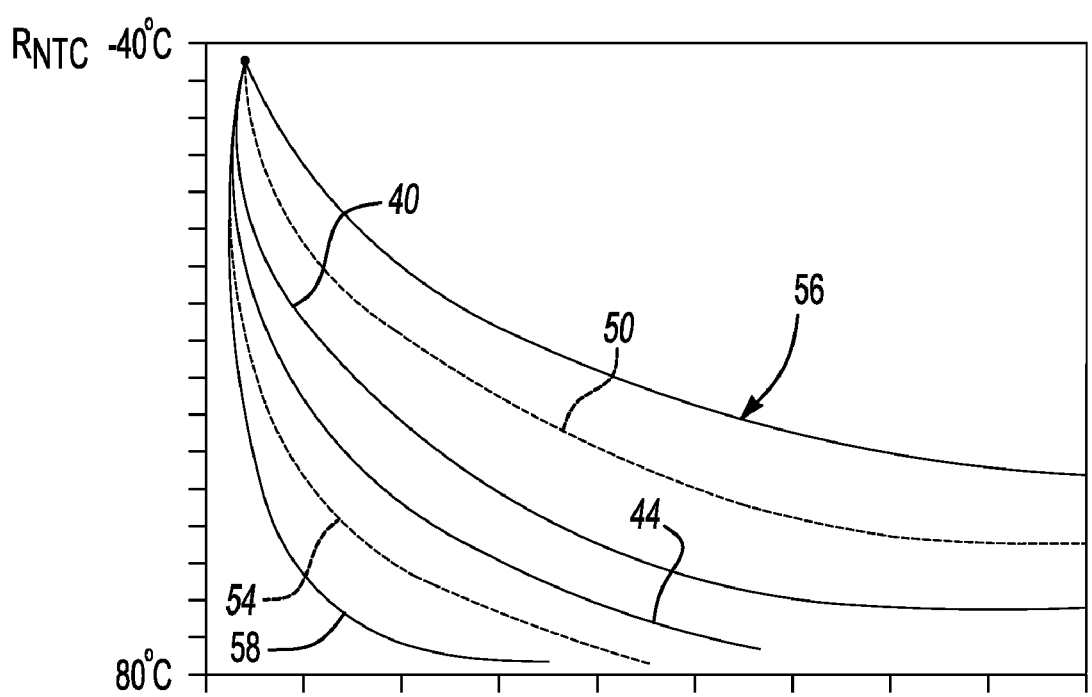
FIG. 3 also illustrates a graph useful for understanding the operation of the heater system of FIG. 1.

Advantageously, the control module programmed with the instructions allows the heater 12 to reach its desired temperature (e.g., $T_n$) while minimizing the amount by which the heater temperature will exceed the desired temperature. As shown in Graph I of FIG. 3, a conventional heater can significantly exceed the desired temperature and oscillate about the desired temperature. However, as shown in Graph II of FIG. 3, a heater according to the present invention can reach the desired temperature without significantly exceeding the desired temperature and without significantly oscillating about the desired temperature.

According to another aspect of the invention, the control module 10 is programmed for preventing underheating, overheating or both. Accordingly, the control module 10 is programmed with data, which correlates a value representative of the temperature sensed by the temperature sensor 14 to an amount of energy provided to the heater 12. Such data is typically acquired by system modeling (i.e., testing the heater to determine temperatures or temperature changes that are sensed for a range of energies or a range of energy changes that are applied to the heater). As such, the data may be supplied as data points, as mathematical functions or the like.

For preventing overheating or underheating, the temperature sensor 14 provides values to the control module 10 representative of the temperatures being sensed by the sensor 14 over time. These representative values are matched with amounts of energy that the control module 10 is instructing the power stage 16 to deliver to the heater 12 over time. In turn, the control module 10 is programmed to compare the representative values and corresponding amounts of energy to the programmed data to assure that the energy being applied to the heater 12 is producing a temperature or temperature change commensurate with an expected temperature change provided by the data.

If the temperatures are commensurate with the energies being applied, the control module 10 typically continues to control the heater 12 in its normal manner. However, if the temperatures are not commensurate with the energies, the control module 10 typically shuts the heater 12 down and optionally instructs that LED 20 of the switch 18 to flash. Referring to FIG. 4, there is illustrated a graph plotting temperature sensor values (shown as resistances ($R_{ntc}$)) a versus time (t). In the graph, two scenarios are modeled as mathematical functions, which are represented by data curves 40, 44. Preferably, the data curves 40, 44 are modeled using empirical data from the heater 12. In the embodiment shown, one data curve 40 models the expected temperature sensor values with respect to time for a scenario in which the power source 28 delivers a minimum acceptable amount of energy (e.g., 8.5 volts) to the heater 12 and the heater 12 does not exhibit a fault condition (e.g., a condition that would substantially change the heat output of the heater). The other data curve 44 models the expected temperature sensor values with respect to time for a scenario in which the power source 28 delivers a maximum acceptable amount of energy (e.g., 16.5 volts) to the heater 12 and the heater 12 does not exhibit a fault condition.

Once these scenarios are modeled, two fault curves 50, 54 are established as mathematical functions based upon the data curves 40, 44. Preferably, the fault curves 50, 54 are established to be within percent tolerances (e.g., 30% or less) of the data curves 40, 44. Thus, one fault curve 50 is modeled as having temperature sensor values that change slower (e.g., at the maximum percent tolerance slower) than the data curve 40 for which the minimum acceptable amount of energy is applied to the heater 12. The other fault curve 54 is modeled as having temperature sensor values that change faster (e.g., at the maximum percent tolerance faster) than the data curve 44 for which the maximum acceptable amount of energy is applied to the heater 12.

Advantageously, the fault curves 50, 54 can be programmed into the control module 10 such that the actual changes of temperature sensor values can be compared to the fault curves 50, 54 to detect whether a fault condition is present for the heater 12. For example, the control module 10 may be programmed to shut down the heater 12 if the heater 12 is exhibiting changes in temperature sensor values that are slower than or outside the fault curve 50, which is based upon the minimum acceptable energy level being applied to the heater 12 (e.g., where an underheating fault condition is present such as that represented by a real data curve 56). Alternatively or additionally, the control module 10 may be programmed to shut down the heater 12 if the heater module 10 is exhibiting changes in temperature sensor values that are faster than or outside the fault curve 54 that is based upon the maximum acceptable energy level being applied to the heater 12 (e.g., where an overheating fault condition is present such as that represented by a real data curve 58). Moreover, whenever a fault condition is detected, the control module 10 may command the LED 18 to flash to indicate such fault.

It should be recognized that it may be desirable for the control module to be programmed to shutdown the heater if the current flowing through the heater is to high (i.e., an overcurrent condition) or too low (i.e., an undercurrent condition). In such an embodiment, the control module typically continuously monitors the current flowing through the heater and if that current falls below a lower current threshold or rises above an upper current threshold, the control module commands the heater to shutdown. In one preferred embodiment, the control module also continuously monitors the voltage being delivered to the heater and, in turn, the control module will adjust the upper and lower current thresholds based upon the voltage measurements (i.e., the thresholds will be raised or lowered in correspondence respectively with the up and down fluctuations of the voltage measurements that can typically be experienced from the energy source). In this preferred embodiment, the control module may also be programmed to shut down the heater if voltage measurements go respectively above or below predetermined upper and lower voltage thresholds (e.g., above 16.5 volts or below 9.0 volts).

According to another aspect of the invention, the system includes a ventilation system and a heater. In such a system, the control module 10 is typically additionally in signaling communication with an air mover 34 (e.g., a blower) configure for moving air that is adjacent trim cover or passenger of a seat. Thus, the control module is typically programmed with instructions for operating both the air mover 34 and the heater 12. Such programming may include instructions for turning the heater 12 and the air mover 34 on and off and such programming may include instructions for operating the heater 12, the air mover 34 or both at a range of different output levels.

According to a preferred embodiment, the control module 10 is programmed with instructions for providing remedial measures if excessive ventilation (e.g., overcooling) and/or excessive heating (e.g., overheating) is detected. The remedial measures can include turning the air mover 34 on in the event that the temperature sensor 14 senses, respectively, a temperature in excess of a predetermined upper limit temperature and turning the heater 12 on in the event that the temperature sensor 14 senses a temperature below a predetermined lower limit temperature.

In a highly preferred embodiment, the control module 10 is programmed with instructions for, during operation of the heater 12, comparing a representative value of a temperature sensed by the temperature sensor 14 to a first set-point value representing a first upper limit temperature. Based upon the comparison, if the sensed temperature is greater than the first upper limit temperature, the control module 10 includes instructions for activating the air mover 34 for a predetermined time period, preferably, although not necessarily, while the heater 12 remains on.

In the embodiment, the control module 10 is also preferably programmed with instructions for, during operation of the heater 12 and optionally the air mover 34 as well, comparing the representative value of the temperature sensed by the temperature sensor 14 to a second set-point value representing a second upper limit temperature greater than the first upper limit temperature. Based upon the comparison, if the sensed temperature is greater than the second upper limit temperature, the control module 10 includes instructions for turning the heater 12 off and turning the air mover 34 on or allowing the air mover 34 to remain on at least until the sensed temperature falls below the second upper limit.

In addition or alternatively, the control module 10 is programmed with instructions for, during operation of the air mover 34, comparing a representative value of a temperature sensed by the temperature sensor 14 to a first set-point value representing a first lower limit temperature. Based upon the comparison, if the sensed temperature is less than the first lower limit temperature, the control module 10 includes instructions for activating the heater 12 for a predetermined time period, preferably, although not necessarily, while the air mover 34 remains on.

In the embodiment, the control module 10 is also preferably programmed with instructions for, during operation of the air mover 34 and optionally the heater 12 as well, comparing the representative value of the temperature sensed by the temperature sensor 14 to a second set-point value representing a second lower limit temperature less than the first upper limit temperature. Based upon the comparison, if the sensed temperature is less than the second lower limit temperature, the control module 10 includes instructions for turning the air mover off and turning the heater 12 on or allowing the heater 12 to remain on at least until the sensed temperature raises above the second lower limit.

The control module may also be programmed with other additional features as well. In one embodiment, the control module is programmed to provide substantially constant energy to the LED such that the light emitted by the LED is substantially constant during operation thereof. In such an embodiment, the control module is programmed to deliver different percentages of energy to the LED depending on the amount of voltage being delivered by the energy source or automotive vehicle battery. In particular, the control module receives continuous signals indicative of the amount of voltage being supplied by the energy source (e.g., the vehicle battery) and, in turn, the control module adjusts the percentage of that amount of voltage that is actually delivered to the LED (e.g., adjusts the percentage of time or number of cycles for which full voltage is supplied). Thus, fluctuations in the amount of voltage supplied by the energy source are accounted for such that the LED can emit a substantially continuous amount of light at least during operation.

The control module may also be programmed with an additional shutdown feature for instances in which a relatively large amount of energy is supplied to the heater for a predetermined amount of time. For example, the control module can be programmed to shut down or stop providing energy to the heater if the power supply has been providing energy at a level greater than 80%, more typically greater than 90% and even more typically about 100% of full energy (i.e., the maximum amount of energy typically supplied to the heater) for a period of time greater than about 10 minutes, more typically greater than about 20 minutes and even more typically about 30 minutes.

In another embodiment, the control module may be programmed with a start-up feature, which is designed to have the power supply provide energy to the heater for a predetermined time upon sensing of a temperature below a particular threshold level at initial start up. For example, under relatively cold conditions (e.g., temperatures below about −20° C. or about −30° C.) it may be possible for the temperature sensor, particularly at initial start-up of the automotive vehicle, the heater or both, to send a signal indicative of a fault even though the heater may still be operable in its desired ranges. As such, the control module can be programmed to, upon sending of a fault condition or an extremely low temperature at start-up of the heater, signal the power supply to provide energy at a predetermined level greater than 80% more typically greater than 90% and even more typically about 100% of full energy (i.e., the maximum amount of energy typically supplied to the heater) for a period of time between about 10 seconds and 5 minutes, more typically between about 50 second and 3 minutes and even more typically between about 80 seconds and 100 seconds. In this manner, the sensed temperatures can be brought into normal readable ranges for the temperature sensor such that the heater and control module can begin operating normally. However, if the sensed temperature remains very low or if the temperature sensor continues to indicate a fault condition, the heater will likely be shut down.

It is also contemplated that the system may include a stuck button detection feature, which only allows the heater or ventilator to be activated when the on/off switch is a button and the button returns to its normal non-depressed position after that button has been depressed. Thus, if the button becomes stuck in a depressed position, the heater, the ventilator or both will not be activated or turned on.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A controller for controlling at least an air mover and a heater of an automotive vehicle comprising;
    at least one control module in signaling communication with an energy source, a sensor, the air mover, a power stage and a switch wherein the energy source provides power to the heater as dictated by the power stage, the sensor senses a temperature associated with the heater and the switch turns the heater on and off and wherein the control module includes:
    i. programming for comparing representative values originating from the sensor to a set of n set point values ($V_1 \ldots V_n$) wherein the representative values are representative of temperatures ($T_s$) sensed by the temperature sensor, the n set-point values are representative of n predetermined temperatures ($T_1 \ldots T_n$) and n is a whole number greater than 1, wherein n is at least 3
    ii. programming for allowing n different amounts of energy ($E_1 \ldots E_n$) to be applied to the heater depending upon the representative value, such different amount be applied during an initial heat up time period of the heater once the heater is turned on; and
    iii. programming for providing remedial measures if a relatively high temperature or a relatively low temperature is detected wherein the remedial measures include programming for turning the air mover on in the event that the temperature sensor senses a temperature in excess of a predetermined upper limit temperature and programming for turning the heater on in the event that the temperature sensor senses a temperature below a predetermined lower limit temperature.

2. A controller as in claim 1 wherein the programming for comparing the representative values and the amount of energy being applied to the heater with programmed data includes establishing a first fault curve and a second fault curve wherein the first fault curve is modeled as having temperature sensor values that change slower than expected and the second fault curve is modeled as having temperature sensor values that change faster than expected.

3. A controller as in claim 1 wherein the switch includes a light emitting diode (LED) and wherein the control module is programmed to provide substantially constant energy to the LED such that the light emitted by the LED is substantially constant during operation thereof.

4. A controller as in claim 1 wherein the control module is programmed with a start-up feature, which is designed to have the power supply provide energy to the heater for a predetermined time upon sensing of a temperature below a particular threshold level at initial start up.

5. A controller as in claim 1 wherein the controller includes a stuck button feature, which only allows the heater or the air mover to be activated when the on/off switch is a button and the button returns to its normal non-depressed position after that button has been depressed.

6. A controller as in claim 1 wherein the different amounts of energy respectively correspond to the predetermined temperatures such that higher predetermined temperatures correspond to lower amounts of energy and wherein the heater is selected from a seat heater or a steering wheel heater of the automotive vehicle.

7. The controller as in claim 1, wherein the different amounts of energy are produced by differing the amount of time for which a single voltage is produced during a time period.

8. The controller as in claim 1, wherein the different amounts of energy are produced by differing voltages provided to the heater during different time periods.

9. The controller as in claim 5, wherein the sensor is a resistance based temperature sensor.

10. The controller as in claim 5, wherein the different amounts of energy ($E_1 \ldots E_n$) respectively inversely correspond to the predetermined temperatures ($T_1 \ldots T_n$) so that higher predetermined temperatures correspond to lower amounts of energy.

11. The controller as in claim 1, wherein the at least one control module is programmed with instructions that allow the heater to reach a desired temperature while minimizing an amount by which a heater temperature will exceed the desired temperature.

12. The controller as in claim 11, wherein the heater reaches the desired temperature without significantly exceeding the desired temperature and without significantly oscillating about the desired temperature.

13. The controller as in claim 1, wherein the control module is programmed with data, which correlates the representative values of the temperature sensed by the temperature sensor to an amount of energy provided by the heater.

14. The controller as in claim 13, wherein the data is supplied as data points or mathematical functions.

15. The controller as in claim 1, wherein if the temperatures sensed by the temperature sensor are not commensurate with the amount of energy applied to the heater, the control module shuts the heater down.

16. The controller as in claim 15, wherein the control module instructs light emitting diode (LED) of the switch to flash when the control module shuts the heater down.

17. The controller as in claim 1, wherein the control module is programmed to shut down or stop providing energy to the heater if the energy source provides power to the heater at a level greater than 80% for a period of time greater than about 20 minutes.

18. The controller as in claim 16, wherein the control module is programmed to shut down or stop providing energy to the heater if the energy source provides power to the heater at a level greater than 90% for a period of time greater than about 10 minutes.

19. The controller as in claim 4, wherein the control module is programmed to send a signal to the energy source to provide power to the heater at a predetermined level greater than 80 percent for a period of time between about 10 seconds and 5 minutes when the sensor, senses the temperature below the threshold level at initial start-up.

20. The controller as in claim 19, wherein the control module continuously monitors the amount of energy being applied to the heater.

\* \* \* \* \*

UNITED STATES PATENT AND TRADEMARK OFFICE
CERTIFICATE OF CORRECTION

PATENT NO. : 8,309,892 B2
APPLICATION NO. : 12/861303
DATED : November 13, 2012
INVENTOR(S) : Fernandez et al.

It is certified that error appears in the above-identified patent and that said Letters Patent is hereby corrected as shown below:

On the title page 4, item [56]: OTHER PUBLICATIONS: Second Non-Patent Literature Document is Missing: "Automotive Heated Seats – Heated Steering Wheels, IGB Automotive Ltd., received by Assignee W.E.T. Automotive Systems, May 2002".

And

Column 9: Claim 9 reads as "The controller as in claim 5, wherein the sensor is a resistance based temperature sensor"
Should read:
"The controller as in claim 1, wherein the sensor is a resistance based temperature sensor".

Signed and Sealed this
Fifth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO.         : 8,309,892 B2
APPLICATION NO.    : 12/861303
DATED              : November 13, 2012
INVENTOR(S)        : Fernandez et al.

It is certified that error appears in the above-identified patent and that said Letters Patent is hereby corrected as shown below:

ON THE TITLE PAGE

Page 4, item [56]: OTHER PUBLICATIONS: Second Non-Patent Literature Document is Missing: "Automotive Heated Seats – Heated Steering Wheels, IGB Automotive Ltd., received by Assignee W.E.T. Automotive Systems, May 2002".

And

IN THE CLAIMS

Column 9, lines 33-34, Claim 9 reads as "The controller as in claim 5, wherein the sensor is a resistance based temperature sensor"
Should read:
"The controller as in claim 1, wherein the sensor is a resistance based temperature sensor".

This certificate supersedes the Certificate of Correction issued March 5, 2013.

Signed and Sealed this
Ninth Day of April, 2013

Teresa Stanek Rea
*Acting Director of the United States Patent and Trademark Office*